(12) United States Patent
Endo

(10) Patent No.: US 6,707,983 B1
(45) Date of Patent: Mar. 16, 2004

(54) IMAGE PROCESSING APPARATUS AND METHOD, AND STORAGE MEDIUM CAPABLE OF BEING READ BY A COMPUTER

(75) Inventor: Hiroaki Endo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/316,026

(22) Filed: May 21, 1999

(30) Foreign Application Priority Data

May 28, 1998 (JP) .......................................... 10-147554

(51) Int. Cl.[7] .............................. H04N 7/26; H04N 5/91
(52) U.S. Cl. ........................ 386/46; 386/109; 386/112
(58) Field of Search .......................... 386/46, 117, 109, 386/111, 112, 27, 33, 107, 92, 1, 38, 40, 124; 348/390.1, 403.1, 420.1, 400.1, 401.1, 402.1, 384.1; H04N 7/26, 5/91

(56) References Cited

U.S. PATENT DOCUMENTS 5,140,437 A * 8/1992 Yonemitsu et al.
6,038,345 A * 3/2000 Osawa et al.

* cited by examiner

Primary Examiner—Robert Chevalier
(74) Attorney, Agent, or Firm—Fitzpatrick, Cella, Harper & Scinto

(57) ABSTRACT

First image data and second image data different from the first image data are input in an image processing apparatus/method. At least one of the first image data and the second image data is encoded while being subjected to orthogonal transformation processing. The first image data and the second image data are transformed into first and second orthogonal transformation coefficient data, and the first and second orthogonal transformation coefficient data are synthesized. A recording medium capable of being read by a computer stores an image processing program for the image processing method.

13 Claims, 12 Drawing Sheets

IMAGE PROCESSING APPARATUS AND METHOD, AND STORAGE MEDIUM CAPABLE OF BEING READ BY A COMPUTER

BACKGROUND OF THE INVENTION

1. Field of the Invention

The present invention relates to an image processing apparatus and method for efficiently synthesizing a plurality of image data while encoding the data, and a storage medium capable of being read by a computer in which an image processing program is stored.

2. Description of the Related Art

When editing images picked up by a video camera, as shown in FIG. 1, output image signals from two video cassette recorders (hereinafter abbreviated as "VCRs") 110 and 112 are input to an image editor 114. An image signal obtained by editing the image signals is output to another VCR 116 in order to be recorded on a recording medium, such as a magnetic tape or the like.

FIG. 2 is a schematic block diagram illustrating the configuration of a camcorder (a video camera incorporating a recording/reproducing apparatus). In FIG. 2, an image pickup device 120 converts an optical image of an object into an electric signal. An A/D (analog-to-digital) converter 122 converts an analog signal from the image pickup device 120 into a digital signal. A compression circuit 124 performs data compression of data output from the A/D converter 122, and records the compressed image data on a recording medium 126. The output of the compression circuit 124 is also supplied to a digital interface (I/F) 128. The digital interface 128 conforms, for example, to IEEE 1394 standards. The image data is output to the outside in a format conforming to the standards.

Data reproduced from the recording medium 126 and the data input to the digital interface 128 are supplied to an expansion circuit 130, which expands the received data from a compressed state. Output data from the expansion circuit 130 is converted into an analog signal by a D/A (digital-to-analog) converter 132, and is supplied to a monitor 134 for image display.

Various image compression methods have been proposed and actually used. Many of these methods use both orthogonal transformation and variable-length encoding.

Conventionally, when synthesizing two images which are recorded in a compressed state as described above, image synthesizing processing is performed after completely expanding image data. FIG. 3 is a schematic block diagram illustrating a conventional image synthesis apparatus.

Compressed image data are input to input terminals 140a and 140b. Variable-length decoding circuits 142a and 142b perform variable-length decoding of the data from the input terminals 140a and 140b, respectively. Inverse orthogonal transformation circuits 144a and 144b perform inverse orthogonal transformation of outputs from the variable-length decoding circuits 142a and 142b, respectively, and output restored image data.

A system control circuit 146 controls the entire apparatus in accordance with the user's operation through an operation unit 148. Particularly, the system control circuit 146 controls a coefficient generation circuit 150 so as to generate coefficients to be used when synthesizing the two image data. The generated coefficients are supplied to multipliers 152a and 152b. The multipliers 152a and 152b multiply the outputs of the inverse orthogonal transformation circuits 144a and 144b by the corresponding coefficients from the coefficient generation circuit 150, respectively. An adder 154 adds the results of the multiplication by the muntipliers 152a and 152b. That is, the adder 154 synthesizes the two images.

An orthogonal transformation circuit 156 performs orthogonal transformation of an output image from the adder 154. A variable-length encoding circuit 158 performs variable-length encoding of the output of the orthogonal transformation circuit 156. The output of the variable-length encoding circuit 158 is output to the outside from an output terminal 160.

As described above, conventionally, the two inverse orthogonal transformation circuits 144a and 144b are required, and orthogonal transformation processing is required when again encoding data after image synthesis. Accordingly, extensive hardware or software is required, and a long time is required for calculation.

SUMMARY OF THE INVENTION

The present invention has been made in consideration of the above-described problems.

It is an object of the present invention to provide an image synthesis apparatus and method capable of providing a smaller circuit and fewer signal processing steps than previously used, and a storage medium that stores program software for realizing the image processing method.

According to one aspect of the present invention, an image processing apparatus includes an input unit for inputting first image data and second image data different from the first image data. At least one of the first image data and the second image data is encoded while being subjected to orthogonal transformation processing. The apparatus also includes a transformation unit for transforming the first image data and the second image data into orthogonal transformation coefficient data, and a synthesis unit for synthesizing the first image data and the second image data transformed by the transformation unit.

According to still another aspect of the present invention, a storage medium capable of being read by a computer stores an image processing program, the program including an input step of inputting first image data and second image data different from the first image data. At least one of the first image data and the second image data is encoded while being subjected to orthogonal transformation processing. The program also includes a transformation step of transforming the first image data and the second image data into orthogonal transformation coefficient data, and a synthesis step of synthesizing the first image data and the second image data transformed in the transformation step.

According to still another aspect of the present invention, in a storage medium, capable of being read by a computer storing an image processing program, the program includes an input step of inputting first image data and second image data different from the first image data. At least one of the first image data and the second image data is encoded while being subjected to orthogonal transformation processing. The program also includes a transformation step of transforming the first image data and the second image data into orthogonal transformation coefficient data, and a synthesis step of synthesizing the first image data and the second image data transformed in the transformation step.

The foregoing and other objects, advantages and features of the present invention will become more apparent from the following detailed description of the preferred embodiments taken in conjunction with the accompanying drawings.

DETAILED DESCRIPTION OF THE PREFERRED EMBODIMENTS

Preferred embodiments of the present invention will now be described in detail with reference to the drawings.

Figure 1:
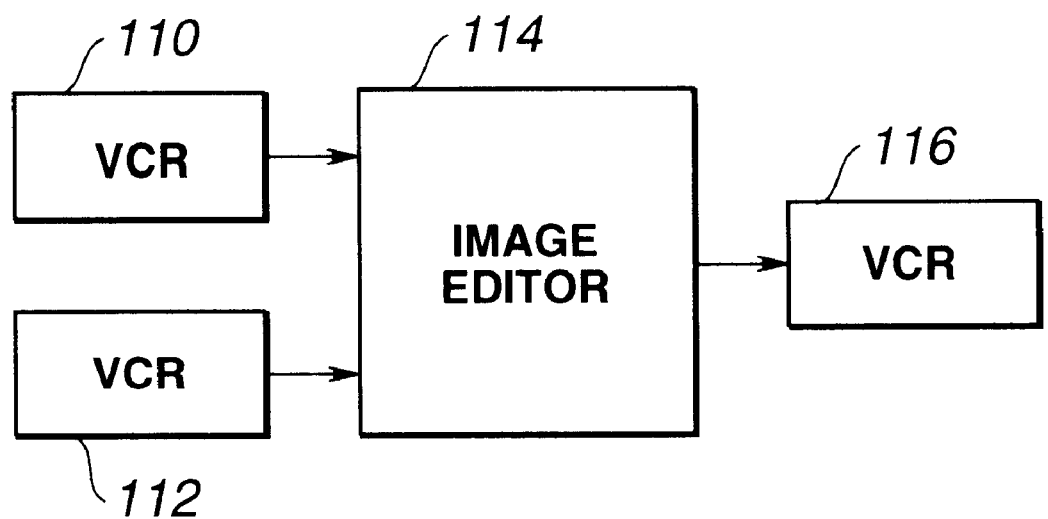
FIG. 1 is a schematic block diagram illustrating the configuration of an editing system for editing two images.
Figure 2:
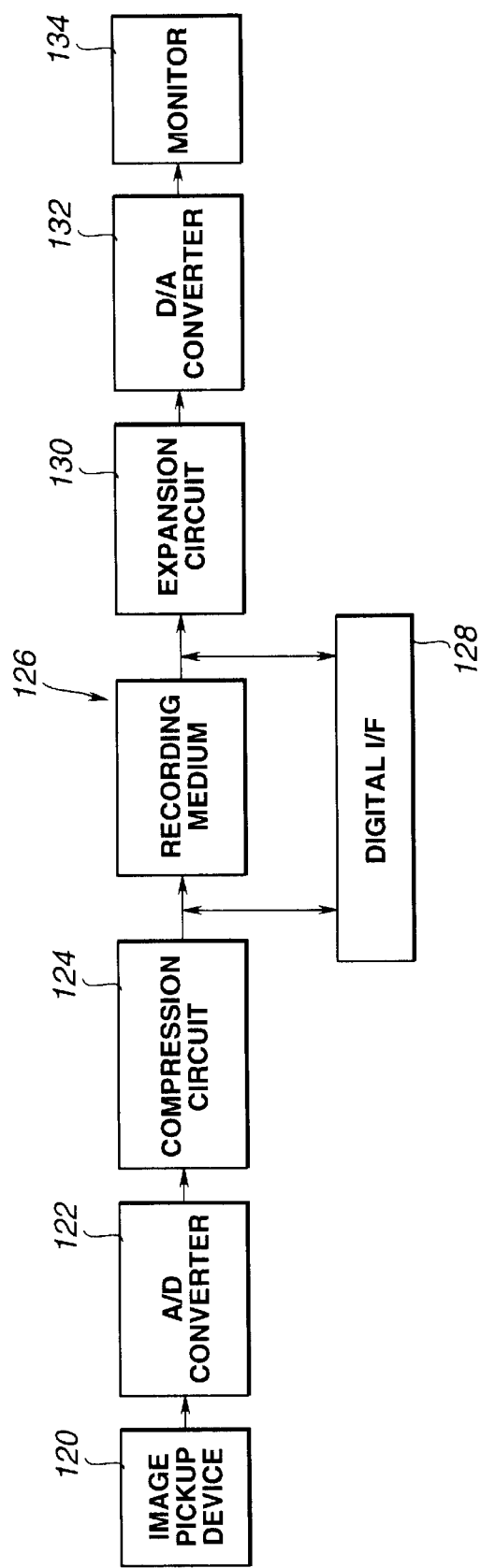
FIG. 2 is a schematic block diagram illustrating the configuration of a VCR shown in FIG. 1.
Figure 3:
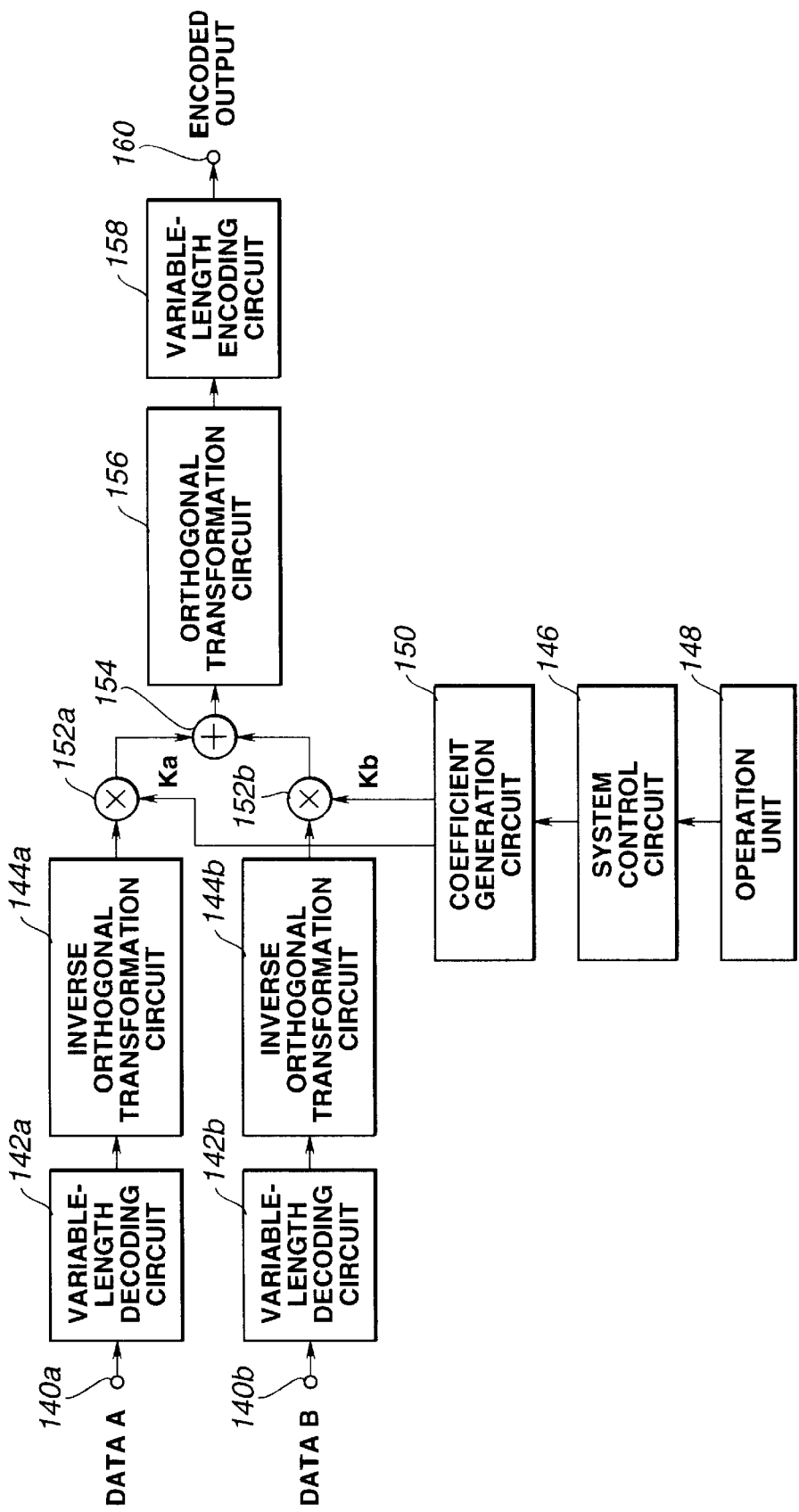
FIG. 3 is a block diagram illustrating the configuration of a conventional image synthesis apparatus.
Figure 4:
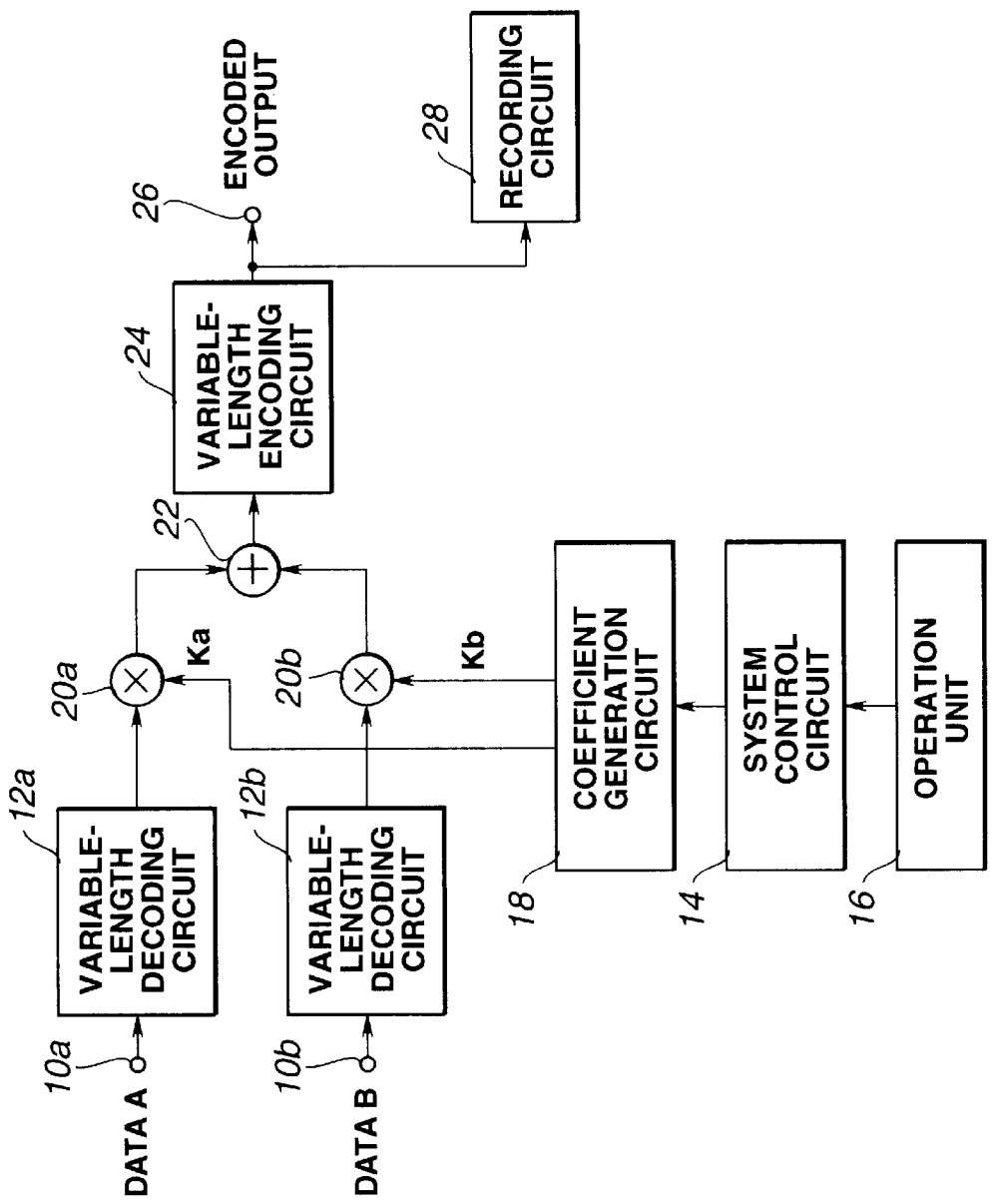
FIG. 4 is a block diagram illustrating the configuration of an image synthesis apparatus according to a first embodiment of the present invention.

FIG. 4 is a schematic block diagram illustrating the configuration of an image synthesis apparatus according to a first embodiment of the present invention. In FIG. 4, image data compressed according to orthogonal transformation and variable-length encoding are input to input terminals 10a and 10b. Variable-length decoding circuits 12a and 12b perform variable-length decoding of the compressed image data from the input terminals 10a and 10b, respectively. A system control circuit 14 controls the entire apparatus. An operation unit 16 is used for inputting various instructions to the system control circuit 14. A coefficient generation circuit 18 outputs multiplication coefficients to be used when synthesizing images input to the input terminals 10a and 10b, under the control of the system control circuit 14. Multipliers 20a and 20b multiply the outputs of the variable-length decoding circuits 12a and 12b (orthogonal transformation coefficient data) by the coefficients Ka and Kb from the coefficient generation circuit 18, respectively. An adder 22 adds the outputs of the multipliers 20a and 20b. A variable-length encoding circuit 24 performs variable-length encoding of the output of the adder 22. The output of the variable-length encoding circuit 24 is output to the outside from an output terminal 26. A recording circuit 28 records the output of the variable-length encoding circuit 24 on a recording medium, such as a video tape, a hard disk or the like.

Figure 5:
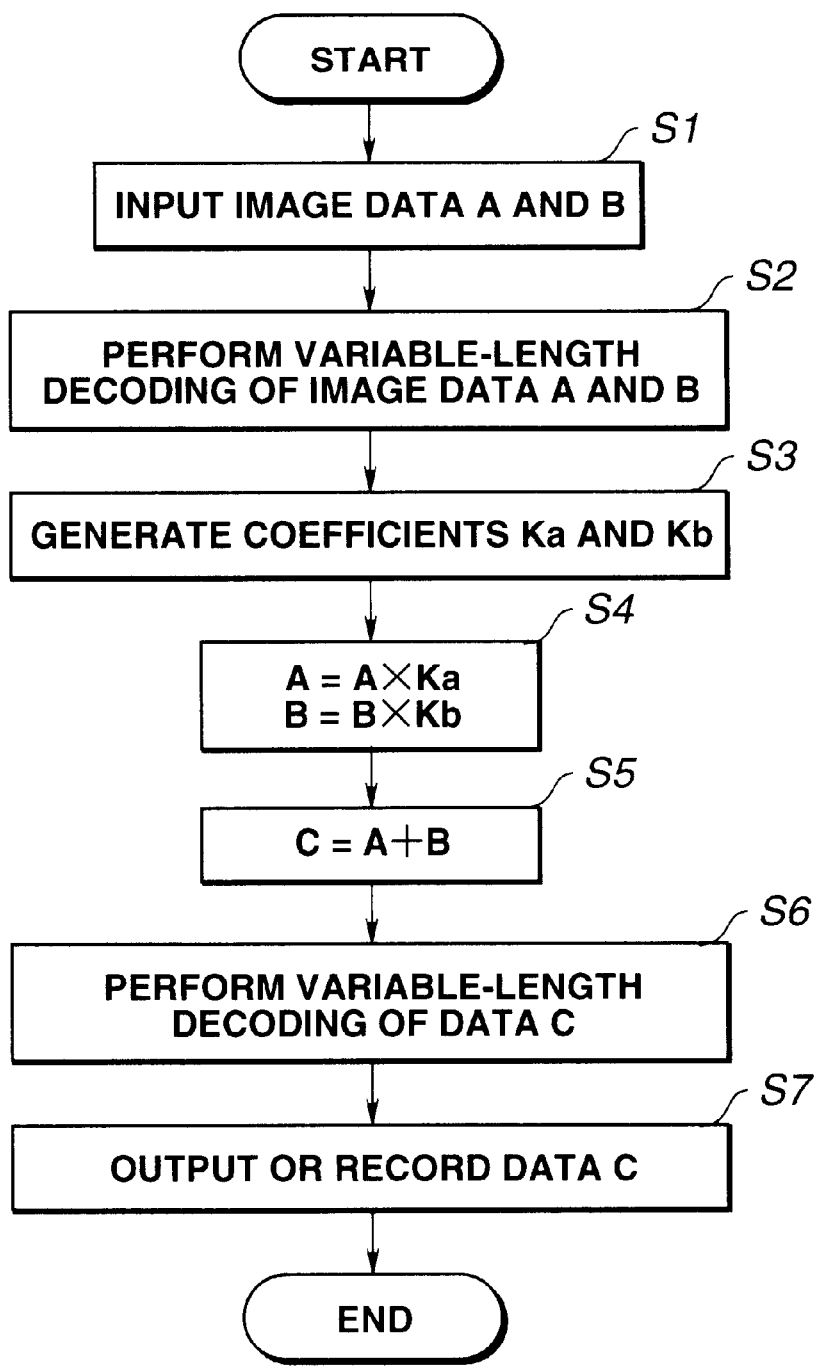
FIG. 5 is a flowchart illustrating image synthesizing processing according to the first embodiment.

FIG. 5 is a flowchart illustrating the operation of the first embodiment. The operation of the first embodiment will now be described with reference to FIG. 5.

Image data A and B compressed according to orthogonal transformation and variable-length encoding are input to the input terminals 10a and 10b, respectively (step S1). The variable-length decoding circuits 12a and 12b perform variable-length decoding of the compressed image data A and B from the input terminals 10a and 10b, respectively, and output orthogonal transformation coefficient data (step S2). The system control circuit 14 causes the coefficient generation circuit 18 to generate synthesis coefficients Ka and Kb for images input to the input terminals 10a and 10b, respectively (step S3). The coefficients Ka and Kb generated by the coefficient generation circuit 18 are supplied to the multipliers 20a and 20b, respectively. The multipliers 20a and 20b multiply the orthogonal transformation coefficient data from the variable-length decoding circuits 12a and 12b by the coefficients Ka and Kb, respectively (step S4). The adder 22 adds the output of the multipliers 20a and 20b (step S5). The variable-length encoding circuit 24 performs variable-length encoding of the output of the adder 22 (step S6). The output of the variable-length encoding circuit 24 is output to the outside from the output terminal 26, or recorded on a recording medium by the recording circuit 28 (step S7).

In the first embodiment, since image synthesis is performed using desired weighting coefficients Ka and Kb in a state of orthogonal transformation coefficient data, it is unnecessary to provide an inverse orthogonal transformation circuit. By adjusting the coefficients Ka and Kb, special editing, such as wipe or the like, can be realized.

Figure 10:
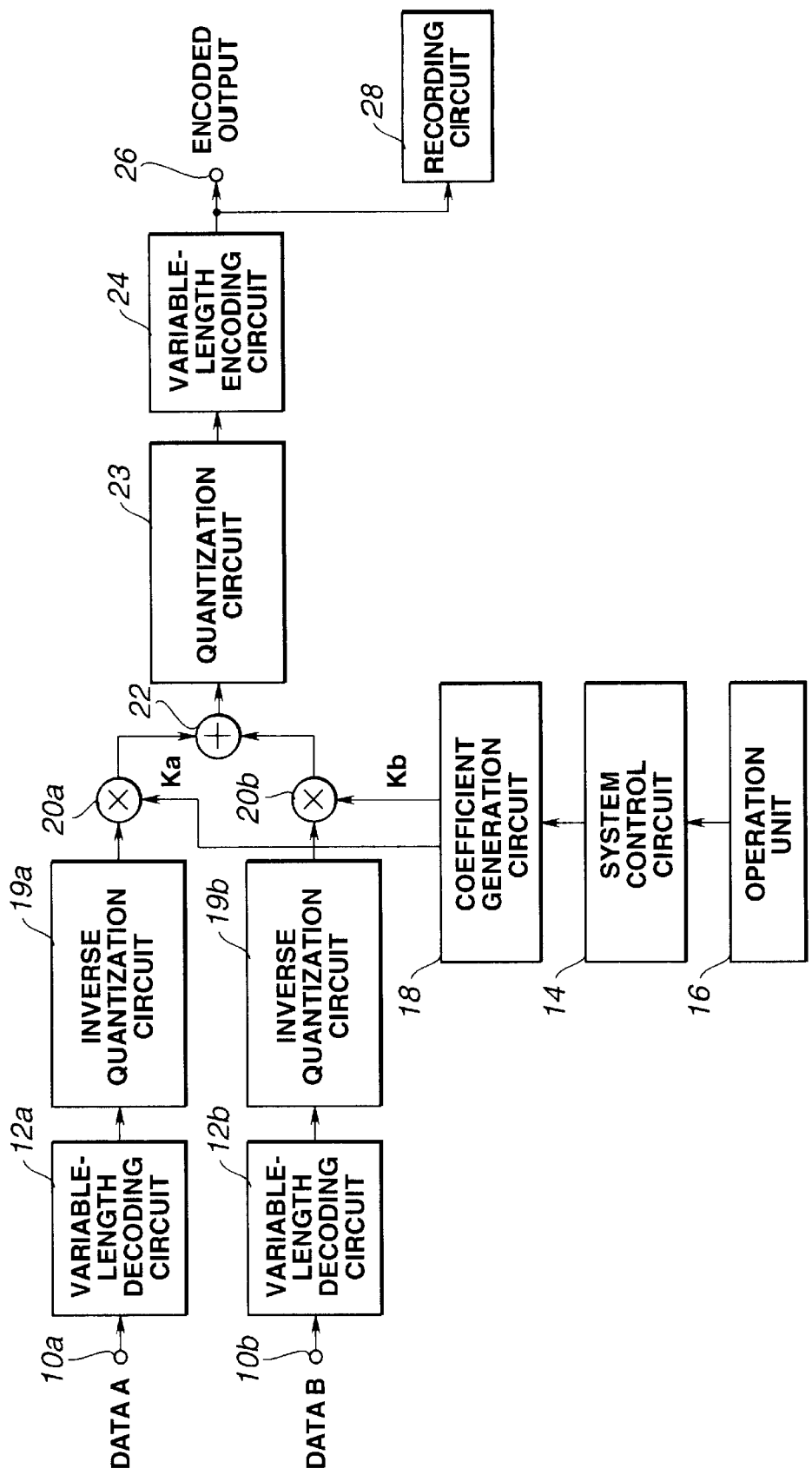
FIG. 10 is a block diagram illustrating the configuration of an image synthesis apparatus according to a modification of the first embodiment.

If image data input to the input terminals 10a and 10b is image data subjected to orthogonal transformation processing followed by quantization and variable-length encoding, then, as shown in FIG. 10, inverse quantization circuits 19a and 19b and a quantization circuit 23 may be inserted.

Although in the above-described first embodiment, both of the two input image data are subjected to compression encoding, the present invention may also be applied to a case in which only one of the two image data is subjected to compression encoding.

Figure 6:
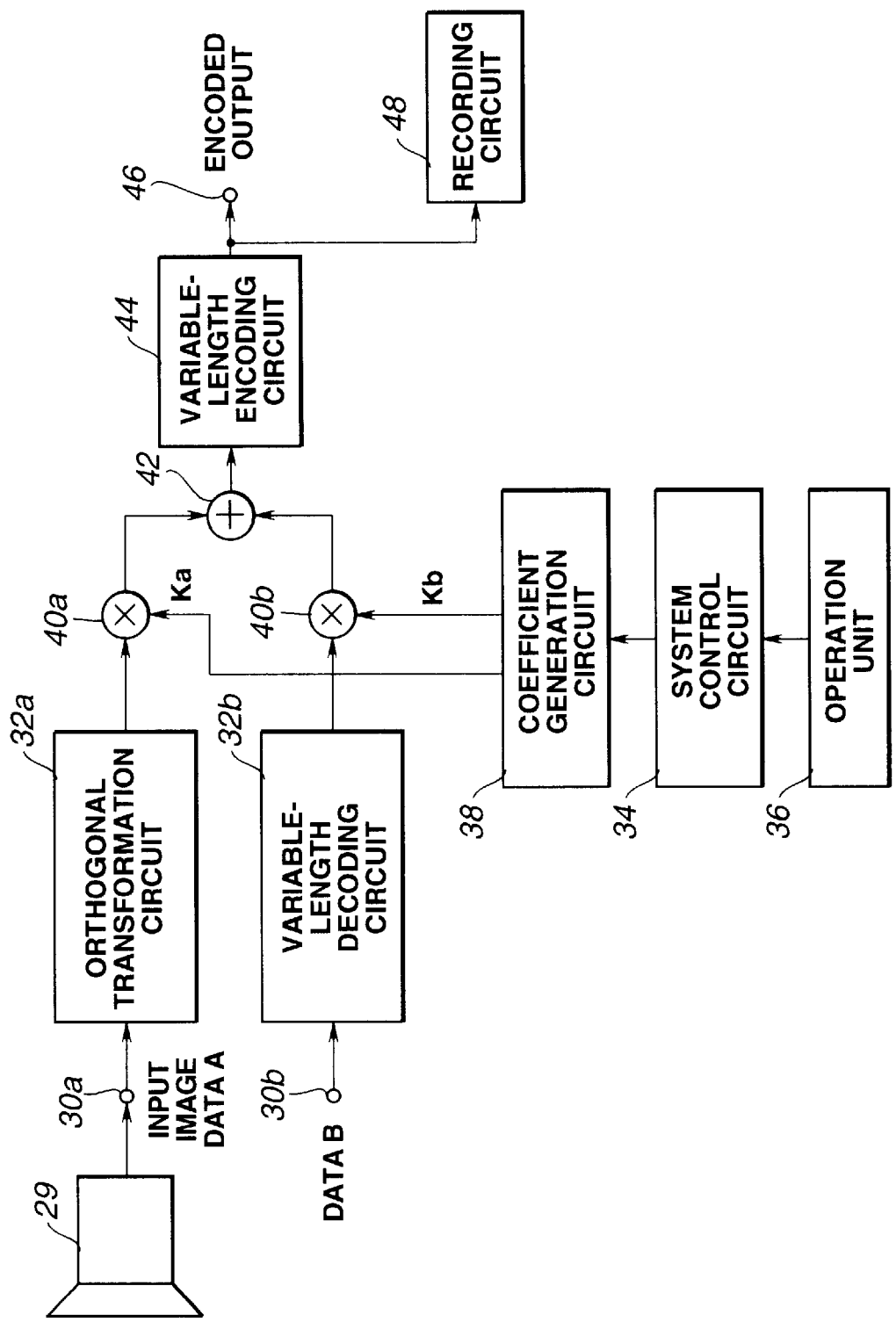
FIG. 6 is a block diagram illustrating the configuration of an image synthesis apparatus according to a second embodiment of the present invention.

FIG. 6 is a schematic block diagram illustrating the configuration of an image synthesis apparatus according to a second embodiment of the present invention. In the second embodiment, one input data is image data itself, and another input data is image data subjected to orthogonal transformation and variable-length encoding.

In FIG. 6, image data which has been picked up by a video camera 29 but has not been subjected to compression encoding is input to an input terminal 30a, and image data compressed according to orthogonal transformation and variable-length encoding is input to an input terminal 30b. An orthogonal transformation circuit 32a performs orthogonal transformation of the image data from the input terminal 30a. A variable-length decoding circuit 32b performs variable-length decoding of the compressed image data from the input terminal 30b. A system control circuit 34 controls the entire apparatus. An operation unit 36 is used for inputting various instructions to the system control circuit 34. A coefficient generation circuit 38 outputs multiplication coefficients to be used when synthesizing images input to the input terminals 30a and 30b, under the control of the system control circuit 34. Multipliers 40a and 40b multiply the outputs of the orthogonal transformation circuit 32a (orthogonal transformation coefficient data) and the output of the variable-length decoding circuit 32b (orthogonal transformation coefficient data) by the corresponding coefficients Ka and Kb from the coefficient generation circuit 38, respectively. An adder 42 adds the outputs of the multipliers 40a and 40b. A variable-length encoding circuit 44 performs variable-length encoding of the output of the adder 42. The output of the variable-length encoding circuit 44 is output to the outside from an output terminal 46. A recording circuit 48 records the output of the variable-length encoding circuit 44 on a recording medium, such as a video tape, a hard disk or the like.

The operation of the second embodiment will now be described.

Image data which has been picked up by the video camera 29 and has not been subjected to compression encoding is input to the input terminal 30a, and image data compressed according to orthogonal transformation and variable-length encoding is input to the input terminal 30b. The orthogonal transformation circuit 32a performs orthogonal transformation of the image data from the input terminal 30a, and the variable-length decoding circuit 32b performs variable-length decoding of the compressed image data (image data subjected to orthogonal transformation and variable-length encoding) from the input terminal 30b. Thus, both of the outputs from the orthogonal transformation circuit 32a and the variable-length decoding circuit 32b become orthogonal transformation coefficient data. The system control circuit 34 causes the coefficient generation circuit 38 to generate synthesis coefficients Ka and Kb for images input to the input terminals 30a and 30b, respectively. The coefficients Ka and Kb generated by the coefficient generation circuit 38 are supplied to the multipliers 40a and 40b, respectively. The multipliers 40a and 40b multiply the output from the orthogonal transformation circuit 32a and the orthogonal transformation coefficient data from the variable-length decoding circuit 32b by the coefficients Ka and Kb, respectively. The adder 42 adds the outputs of the multipliers 40a and 40b. The variable-length encoding circuit 44 performs variable-length encoding of the output of the adder 42. The output of the variable-length encoding circuit 44 is output to the outside from the output terminal 46, or recorded on a recording medium by the recording circuit 48.

Figure 11:
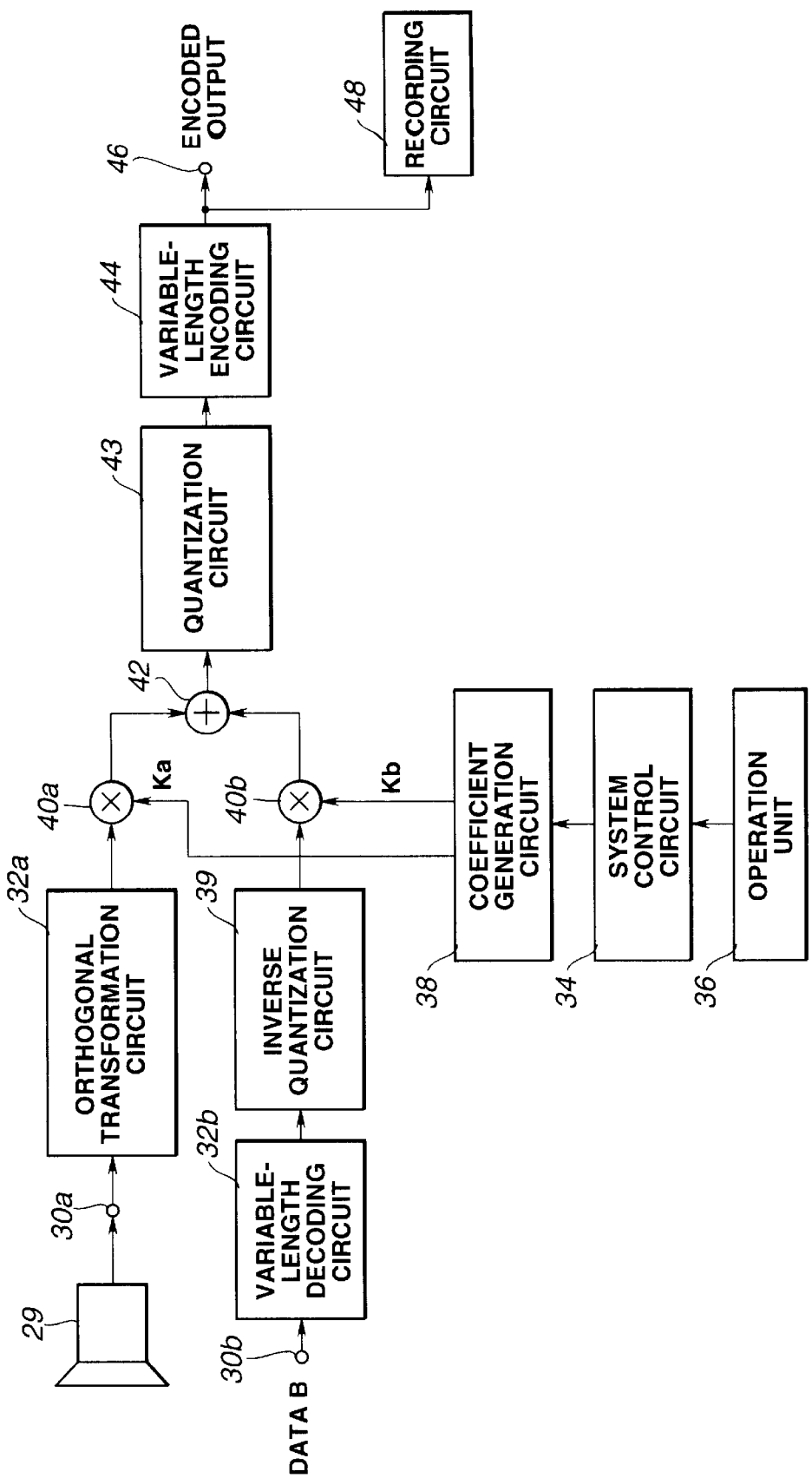
FIG. 11 is a block diagram illustrating the configuration of an image synthesis apparatus according to a modification of the second embodiment.

If image data input to the input terminal 30b is image data subjected to orthogonal transformation processing followed by quantization and variable-length encoding, and the image data output from the adder 42 is quantized and subjected to variable-length encoding, then, as shown in FIG. 11, an inverse quantization circuit 39 and a quantization circuit 43 may be inserted.

Figure 7:
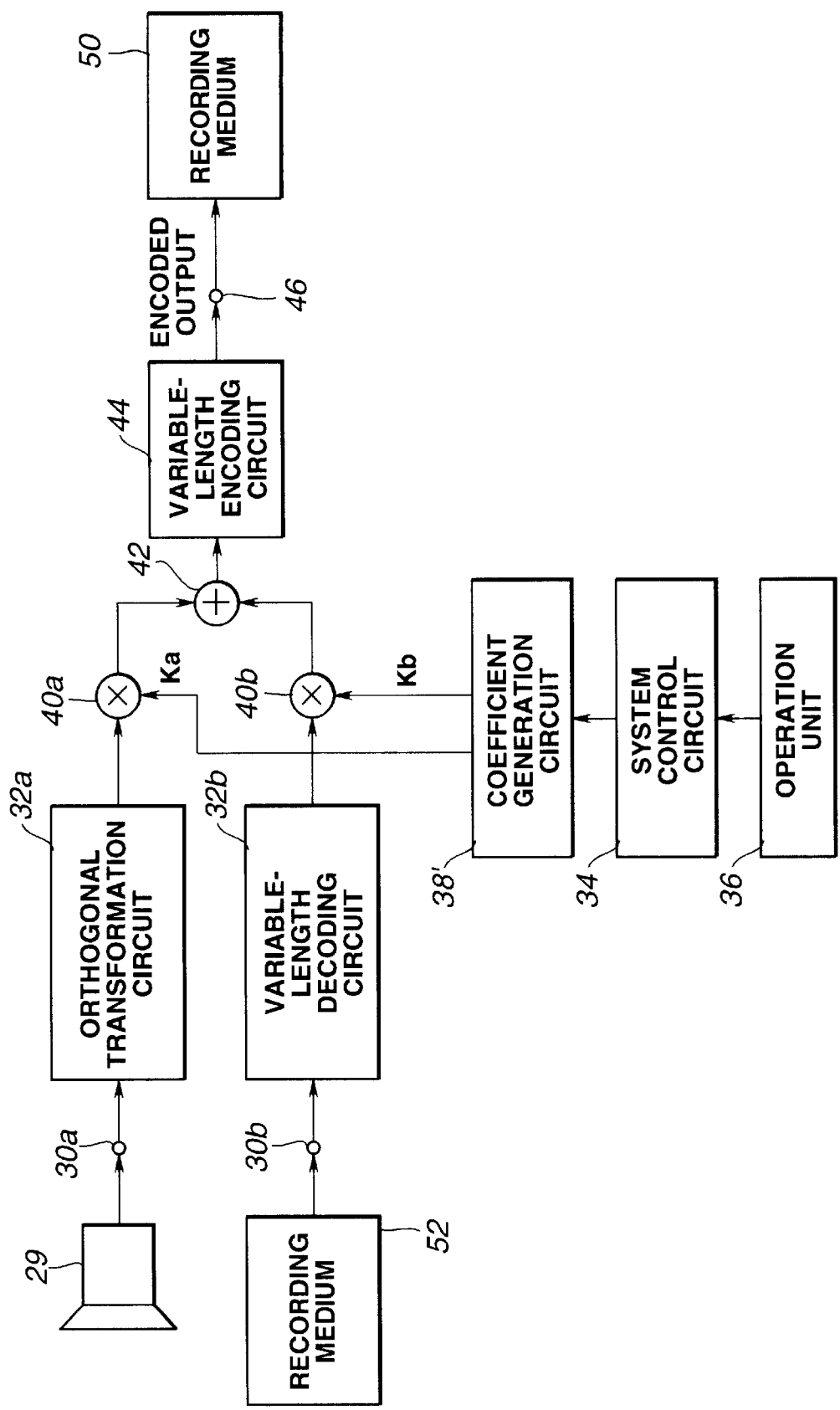
FIG. 7 is a block diagram illustrating the configuration of an image synthesis apparatus according to a third embodiment of the present invention.

The configuration shown in FIG. 6 may also be applied to a process of performing switching between two images while partially overlapping the images. FIG. 7 is a block diagram illustrating the configuration of an image synthesis apparatus when the configuration shown in FIG. 6 is used for image switching processing, according to a third embodiment of the present invention. In FIG. 7, the same components as those shown in FIG. 6 are indicated by the same reference numerals, and further description thereof will be omitted.

In FIG. 7, compressed image data reproduced from a recording medium 52 is input to an input terminal 30b, and the compressed image data output from an output terminal 46 is recorded on a recording medium 50. A coefficient Ka supplied from a coefficient generation circuit 38' to a multiplier 40a equals 1−K, and a coefficient Kb supplied from the coefficient generation circuit 38' to a multiplier 40b equals K.

Figure 8:
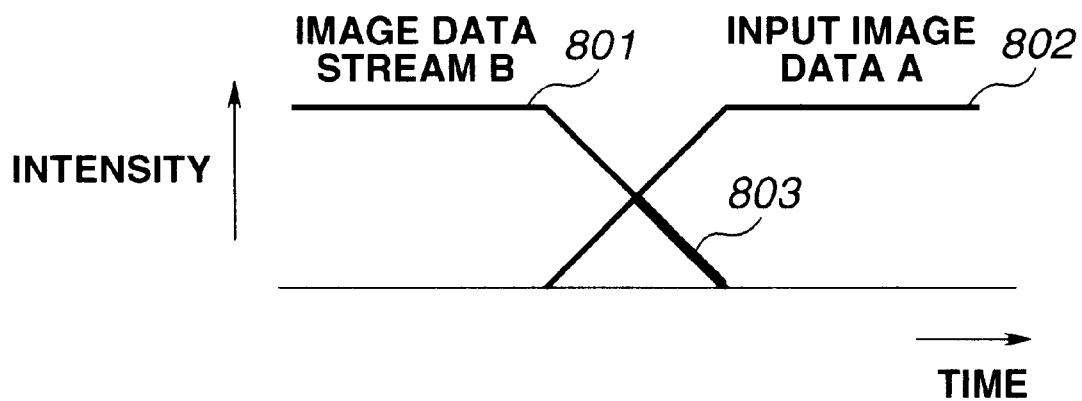
FIG. 8 is a diagram illustrating image switching in the image synthesis apparatus shown in FIG. 7.

By continuously changing the coefficient K from 1 to 0 every time image synthesis processing for one frame is completed, an output image (an image to be recorded on the recording medium 50) continuously changes, as shown in FIG. 8, from image data stream B (waveform 801) input to the input terminal 30b (the image reproduced from the recording medium 52) to input image data A (waveform 802) to an input terminal 30a.

At that time, for example, by displaying the same picture frame or using only the DC component of the orthogonal transformation coefficient when the intensity of the image data stream B input to the input terminal 30b is halved (waveform 803), the amount of calculation necessary for image synthesis can be reduced.

Figure 9:
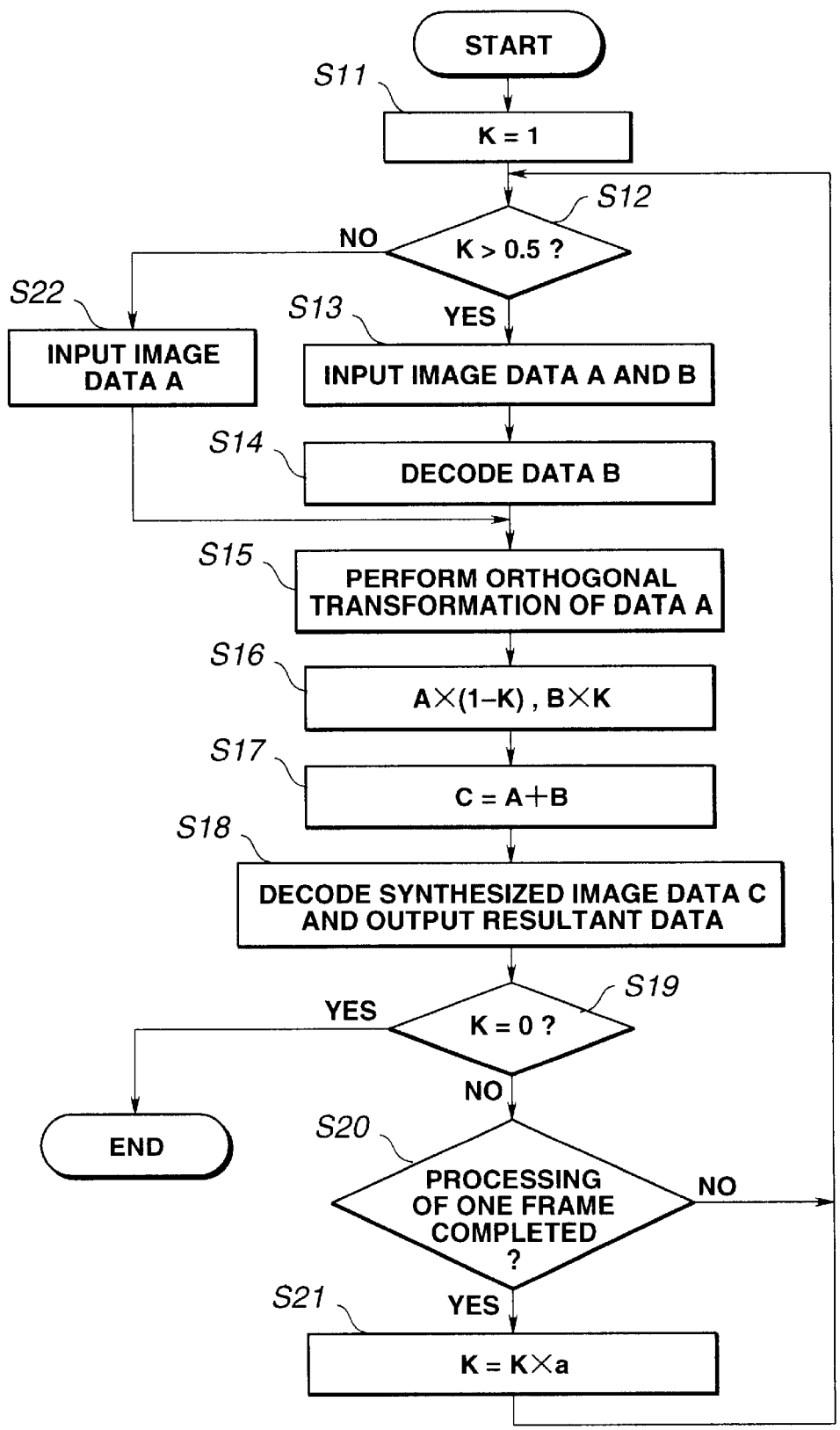
FIG. 9 is a flowchart illustrating image synthesizing processing by the image processing apparatus shown in FIG. 7.

FIG. 9 is a flowchart illustrating processing in which, when the synthesis coefficient of the image data stream B input to the input terminal 30b is equal to or less than ½, the same data is used for the image data stream B. In FIG. 9, "a" represents a positive coefficient less than 1. When the value "a" is large, image switching is slow, and when the value "a" is small, image switching is fast.

The multiplication coefficient K is set to 1 as an initial value (step S11). In step S12, it is determined if the value K is larger than 0.5. If the result of the determination in step S12 is affirmative, the data A and B are received from the input terminals 30a and 30b, respectively (step S13). Then, the image data stream B input to the input terminal 30b is subjected to variable-length decoding by a variable-length decoding circuit 32b (step S14). Then, the input image data A input to the input terminal 30a is subjected to orthogonal transformation (for example, discrete cosine transform) by an orthogonal transformation circuit 32a (step S15). A multiplier 40a multiplies the output of the orthogonal transformation circuit 32a by the coefficient 1−K, and a multiplier 40b multiplies the output of the variable-length decoding circuit 32b by the coefficient K (step S16). Then, an adder 42 adds the outputs of the multipliers 40a and 40b (step S17). A variable-length encoding circuit 44 performs variable-length encoding of the output of the adder 42, serving as synthesized image data, and outputs the resultant data from the output terminal 46 to the recording medium 50 (step S18).

In step S19, it is determined if the value K equals 0. If the result of the determination in step S19 is negative, the process proceeds to step S20, where it is determined if processing of one frame has been completed. If the result of the determination in step S20 is negative, the processing starting from step S12 is repeated. If the result of the determination in step S20 is affirmative, the multiplication coefficient K is updated to K×a (step S21), and the processing starting from step S12 is repeated.

If the result of the determination in step S12 is negative, only the input image data A at the input terminal 30a is received (step S22). Then, orthogonal transformation is performed (step S15), and image synthesis is performed using the variable-length decoded data of the previously used image data stream B without modifying the data (steps S16 and S17).

Figure 12:
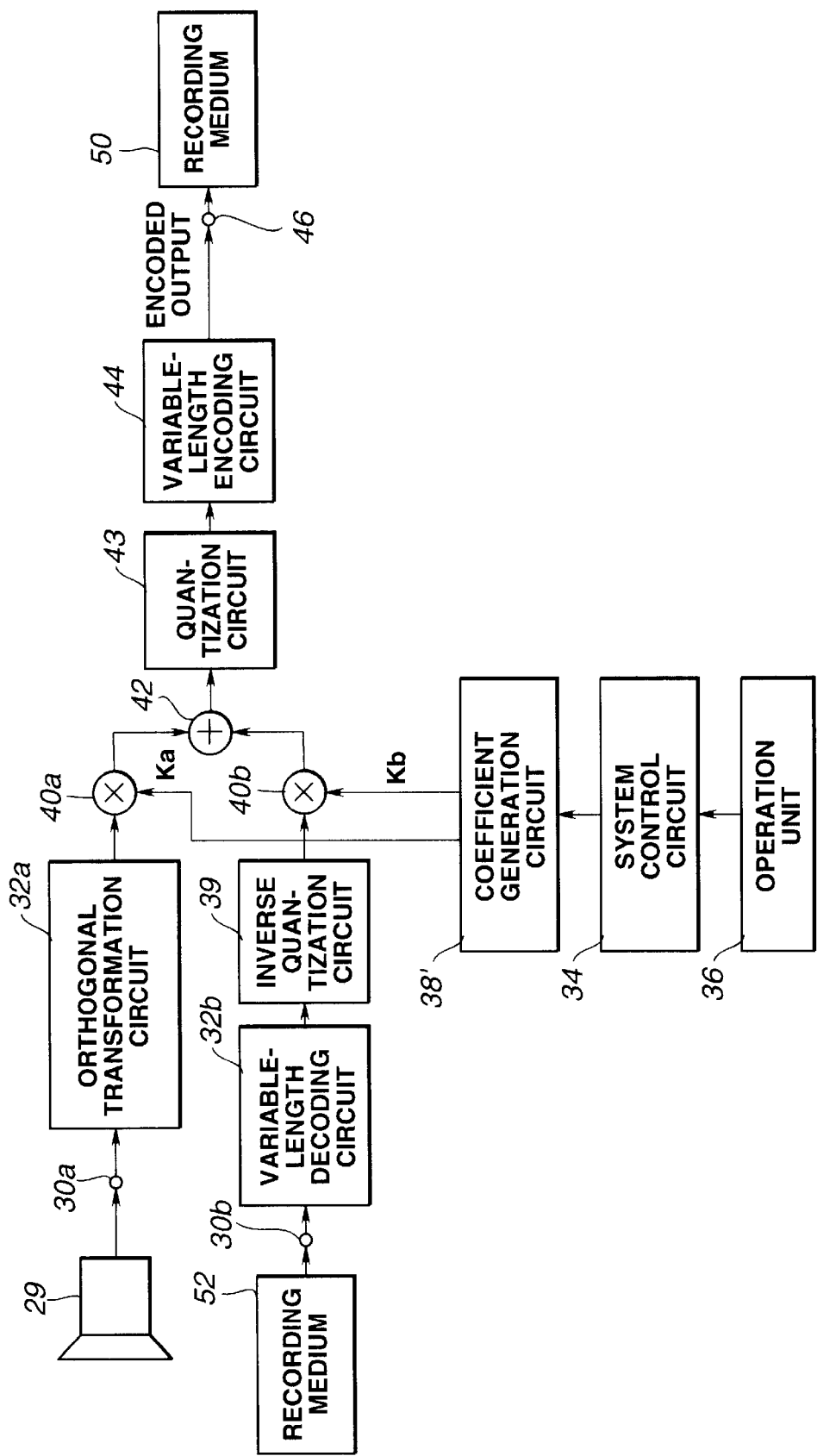
FIG. 12 is a block diagram illustrating the configuration of an image synthesis apparatus according to a modification of the third embodiment.
Figure 5:
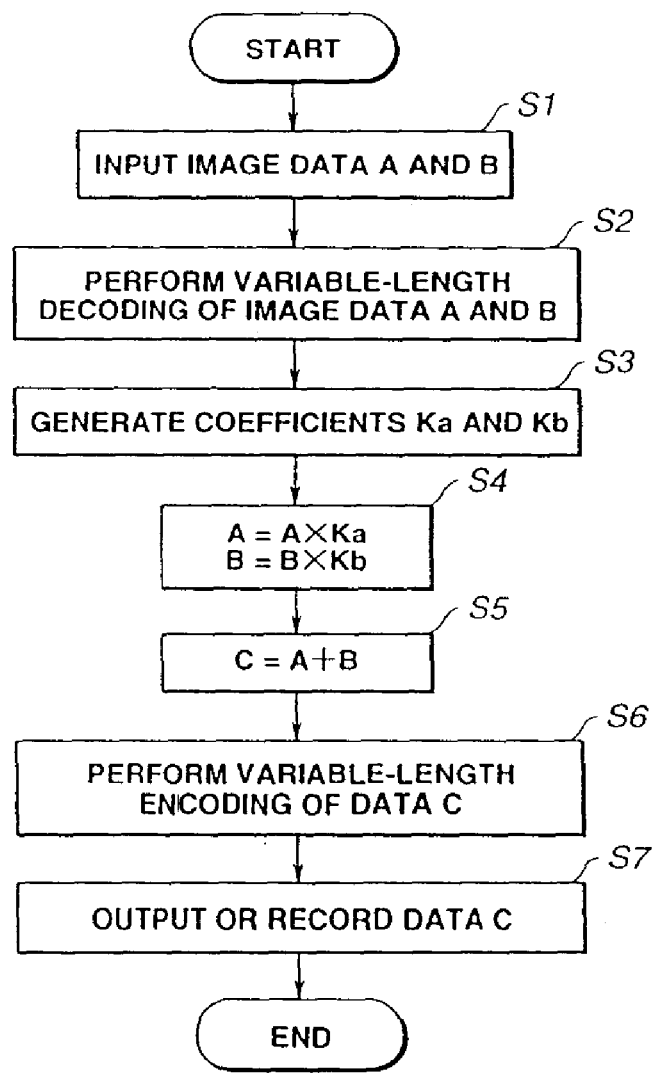
Figure 9:
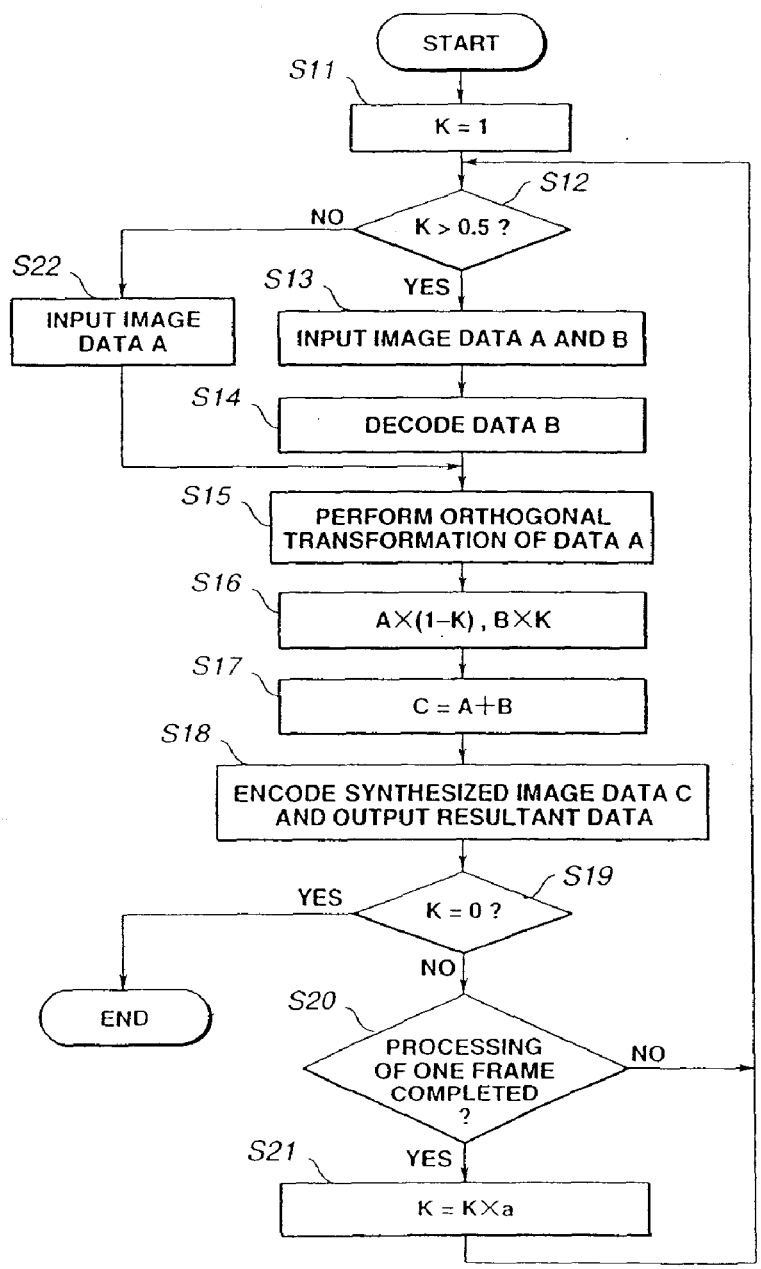

If image data input to the input terminal 30b is image data subjected to orthogonal transformation processing followed by quantization and variable-length encoding, and the image data output from the multiplier 42 is quantized and subjected to variable-length encoding, a configuration as shown in FIG. 12 may be adopted. In FIG. 12, the same components as those shown in FIGS. 7 and 11 are indicated by the same reference numerals.

The present invention may be applied to a system comprising a plurality of apparatuses (such as a host computer, an interface apparatus, a reader, a printer and the like), or to an apparatus comprising a single unit (such as a copier, a facsimile apparatus or the like).

The present invention may also be realized by supplying a computer (a CPU (central processing unit) or an MPU (microprocessor unit)) within an apparatus or a system connected to various devices in order to operate the devices with program codes of software for realizing the functions of the above-described embodiments, and causing the computer to operate the various devices in accordance with a stored program.

In such a case, the program codes of the software realize the functions of the embodiments, so that the program codes themselves and means for supplying the computer with the program codes, such as a storage medium storing the program codes, constitutes the present invention. For example, a floppy disk, a hard disk, an optical disk, a magnetooptical disk, a CD(compact disk)-ROM (read-only memory), a CD-R (recordable), a magnetic tape, a nonvolatile memory card, a ROM or the like may be used as the storage medium for storing the program codes.

The present invention may, of course, be applied not only to a case in which the functions of the above-described embodiments are realized by execution of supplied program codes by a computer, but also to a case in which the functions of the above-described embodiments are realized by cooperation of the program codes with an OS (operating system) operating in the computer, other application software or the like.

The present invention may, of course, be applied to a case in which, after storing supplied program codes in a memory provided in a function expanding board of a computer or in a function expanding unit connected to the computer, a CPU or the like provided in the function expanding board or the function expanding unit performs a part or the entirety of actual processing, and the functions of above-described embodiments are realized by the processing.

The individual components designated by blocks in the drawings are all well known in the image processing apparatus and method arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the cotrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
   input means for inputting first image data and second image data different from the first image data, at least one of the first image data and the second image data having been encoded while being subjected to orthogonal transformation processing;
   transformation means for transforming the first image data into first orthogonal transformation coefficient data and the second image data into second orthogonal transformation coefficient data; and
   synthesis means for synthesizing the orthogonal transformation coefficient data of the first image data transformed by said transformation means and the orthogonal transformation coefficient data of the second image data transformed by said transformation means,
   wherein said synthesis means generates a synthesized image by adding the transformed first image data multiplied by a first coefficient and the transformed second image data multiplied by a second coefficient.

2. An apparatus according to claim 1, further comprising encoding means for encoding image data obtained by the synthesis of said synthesis means.

3. An apparatus according to claim 1, wherein the first image data and the second image data input by said input means have been encoded while being subjected to orthogonal transformation processing, and wherein said transformation means decodes the image data to orthogonal transformation coefficient data.

4. An image processing apparatus comprising:
   input means for inputting first image data and second image data different from the first image data, wherein the first image data is unencoded image data and the second image data has been encoded while being subjected to orthogonal transformation;
   transformation means for transforming the first image data into first orthogonal transformation coefficient data and the second image data into second orthogonal transformation coefficient data, wherein said transformation means performs orthogonal transformation processing of the first image data and decodes the second image data to orthogonal transformation coefficient data; and
   synthesis means for synthesizing the orthogonal transformation coefficient data of the first image data transformed by said transformation means and the orthogonal transformation coefficient data of the second image data transformed by said transformation means.

5. An apparatus according to claim 4, wherein said input means further comprises image pickup means for picking up an image of an object and outputting the first image data for the image of the object.

6. An apparatus according to claim 4, wherein said input means further comprises reproducing means for reproducing the second image data.

7. An apparatus according to claim 2, wherein said encoding means further comprises quantization means for quantizing the image data obtained by the synthesis of said synthesis means.

8. An apparatus according to claim 2, further comprising recording means for recording the image data encoded by said encoding means on a recording medium.

9. An apparatus according to claim 1, wherein the first coefficient is K (0<K<1), and the second coefficient is (1−K).

10. An image processing method comprising the steps of:
    inputting first image data and second image data different from the first image data, at least one of the first image data and the second image data having been encoded while being subjected to orthogonal transformation processing;
    transforming the first image data into first orthogonal transformation coefficient data and the second image data into second orthogonal transformation coefficient data; and
    synthesizing the first orthogonal transformation coefficient data and the second orthogonal transformation coefficient data,
    wherein said synthesizing step generates a synthesized image by adding the first orthogonal transformation data multiplied by a first coefficient and the second orthogonal transformation data multiplied by a second coefficient.

11. A storage medium capable of being read by a computer and for storing an image processing program, said program comprising:
    an input step of inputting first image data and second image data different from the first image data, at least one of the first image data and the second image data having been encoded while being subjected to orthogonal transformation processing;
    a transformation step of transforming the first image data into first orthogonal transformation coefficient data and the second image data into second orthogonal transformation coefficient data; and
    a synthesis step of synthesizing the first orthogonal transformation coefficient data and the second orthogonal transformation coefficient data,
    wherein said synthesis step generates a synthesized image by adding the first orthogonal transformation data multiplied by a first coefficient and the second orthogonal transformation data multiplied by a second coefficient.

12. An image processing method comprising the steps of:
    inputting first image data and second image data different from the first image data,
    wherein the first image data is unencoded image data and the second image data has been encoded while being subjected to orthogonal transformation;
    transforming the first image data into first orthogonal transformation coefficient data and the second image data into second orthogonal transformation coefficient data,
    wherein said transforming step performs orthogonal transformation processing of the first image data and decodes the second image data to orthogonal transformation coefficient data; and
    synthesizing the first orthogonal transformation coefficient data and the second orthogonal transformation coefficient data.

13. A storage medium, capable of being read by a computer, storing an image processing program, said program comprising:
    an input step of inputting first image data and second image data different from the first image data,
    wherein the first image data is unencoded image data and the second image data has been encoded while being subjected to orthogonal transformation;
    a transformation step of transforming the first image data into first orthogonal transformation coefficient data and the second image data into second orthogonal transformation coefficient data,
    wherein said transforming step performs orthogonal transformation processing of the first image data and decodes the second image data to orthogonal transformation coefficient data; and
    a synthesis step of synthesizing the first orthogonal transformation coefficient data and the second orthogonal transformation coefficient data.

* * * * *

UNITED STATES PATENT AND TRADEMARK OFFICE
CERTIFICATE OF CORRECTION

PATENT NO. : 6,707,983 B1
DATED : March 16, 2004
INVENTOR(S) : Hiroaki Endo

It is certified that error appears in the above-identified patent and that said Letters Patent is hereby corrected as shown below:

Drawings,
Sheet No. 5, Figure 5, replace with attached amended Figure 5.
Sheet No. 9, Figure 9, replace with attached amended Figure 9.

Column 2,

Line 38, "unit." should read --unit. ¶ According to another aspect of the present invention, an image processing method includes the steps of inputting first image data and second image data different from the first image data. At least one of the first image data and the second image data is encoded while being subjected to orthogonal transformation processing. The method also includes the steps of transforming the first image data and the second image data into orthogonal transformation coefficient data, and synthesizing the transformed first image data and second image data.--.

Lines 51-63, should be deleted.

Column 7,
Line 16, "constitutes" should read -- constitute --.
Line 17, "magnetooptical" should read -- magneto-optical --.

Signed and Sealed this

Ninth Day of November, 2004

JON W. DUDAS
*Director of the United States Patent and Trademark Office*